United States Patent [19]

Head et al.

[11] Patent Number: 4,695,227
[45] Date of Patent: Sep. 22, 1987

[54] ALL COMPOSITE, CONSTANT SPEED UNIVERSAL JOINT FOR USE IN A SHAFT DRIVEN TILTABLE MAIN ROTOR FOR A HELICOPTER

[75] Inventors: Robert E. Head, Palos Verdes Estates; Samuel S. Yao, Fountain Valley, both of Calif.

[73] Assignee: Hughes Helicopters Inc., Culver City, Calif.

[21] Appl. No.: 706,444

[22] Filed: Feb. 27, 1985

[51] Int. Cl.$^4$ .................. B64C 27/35; B64C 27/52
[52] U.S. Cl. .......................... 416/134 A; 416/102; 416/138; 416/148
[58] Field of Search ........... 416/134 A, 135 B, 138 A, 416/131 A, 141, 102, 140, 148-150

[56] References Cited

U.S. PATENT DOCUMENTS

| | | | |
|---|---|---|---|
| 1,993,260 | 3/1935 | Burns | 267/21 |
| 2,350,467 | 11/1950 | Hunt | 64/1 |
| 2,487,653 | 11/1949 | Heintze | 170/135.75 |
| 2,631,680 | 3/1953 | Le Compte et al. | 170/160.53 |
| 2,737,033 | 3/1956 | Bendall | 64/14 |
| 2,883,131 | 4/1959 | McNally | 248/22 |
| 3,111,172 | 11/1963 | Gorndt et al. | 170/160.1 |
| 3,157,731 | 11/1964 | Torr | 174/40 |
| 3,292,711 | 12/1966 | Peterson | 170/160.53 |
| 3,460,628 | 8/1969 | Tankersley | 170/160.58 |
| 3,531,068 | 9/1970 | Fischer | 248/15 |
| 3,748,061 | 7/1973 | Henrich | 416/93 |
| 3,874,815 | 4/1975 | Baskin | 416/134 |
| 3,880,551 | 4/1975 | Kisovec | 416/141 X |
| 3,933,324 | 1/1976 | Ostrowski | 416/102 X |
| 3,934,537 | 1/1976 | Hall | 115/17 |
| 3,999,887 | 12/1976 | McGuire | 416/134 A |
| 4,008,980 | 2/1977 | Noehren et al. | 416/134 A |
| 4,053,258 | 10/1977 | Mouille | 416/134 A |
| 4,087,203 | 5/1978 | Ferris | 416/134 A X |
| 4,093,400 | 6/1978 | Rybicki | 416/141 |
| 4,115,031 | 9/1978 | Drees et al. | 416/134 A |
| 4,182,597 | 1/1980 | Derschmidt | 416/134 A |
| 4,227,859 | 10/1980 | Gouzien et al. | 416/134 A |
| 4,240,763 | 12/1980 | Moore | 403/203 |
| 4,244,677 | 1/1977 | Noehren et al. | 416/134 A |
| 4,284,367 | 8/1981 | Tuson et al. | 405/202 |
| 4,293,277 | 10/1981 | Aubrey | 416/134 A |
| 4,323,332 | 4/1982 | Fradenburgh | 416/134 A |
| 4,326,834 | 4/1982 | Ostrowski | 416/134 A |
| 4,381,902 | 5/1983 | Head et al. | 416/134 A |
| 4,477,225 | 10/1984 | Burkam | 416/134 A |
| 4,512,717 | 4/1985 | Pancotti et al. | 416/134 A |
| 4,566,856 | 1/1986 | Miller | 416/134 A |
| 4,575,358 | 3/1986 | Ferris | 416/134 A X |

FOREIGN PATENT DOCUMENTS

| | | | |
|---|---|---|---|
| 931198 | 2/1948 | France | 416/148 |
| 363642 | 2/1939 | Italy | 416/148 |

Primary Examiner—Everette A. Powell, Jr.
Attorney, Agent, or Firm—Beehler, Pavitt, Siegemund, Jagger, Martella & Dawes

[57] ABSTRACT

A universal joint for use in a pitch cone rotor system in a helicopter is comprised of crossed lift beams, one beam of which is coupled to the rotor hub and the other beam of which is coupled to the driven rotor shaft. The two crossed lift beams are coupled to each other through a cruciform case. The cruciform case in turn is coupled to each of the crossed lift beams by means of a plurality of flexures. The flexures and cruciform case are made of composite fiber materials and the flexures are soft enough to permit angular and translational deflections of the crossbeams with respect to each other thereby tending to smooth out and reduce sudden changes in rotor speed between the shaft and rotor system and thereby tending to make rotor speeds more uniform. The crossed lift beams are further coupled together at the center of their crossing by a flexible elastomeric tension link which conducts rotor loads between the two beams when the rotor develops negative lift loads on the ground and in flight. A hollow laminated elastomeric compression fitting is placed between the beams at their center to transmit the rotor lift force between them.

9 Claims, 12 Drawing Figures

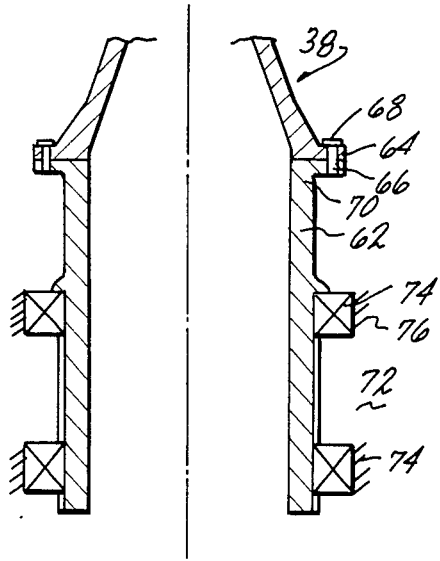
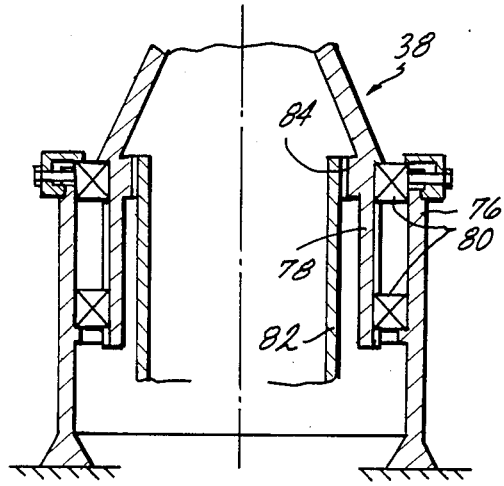
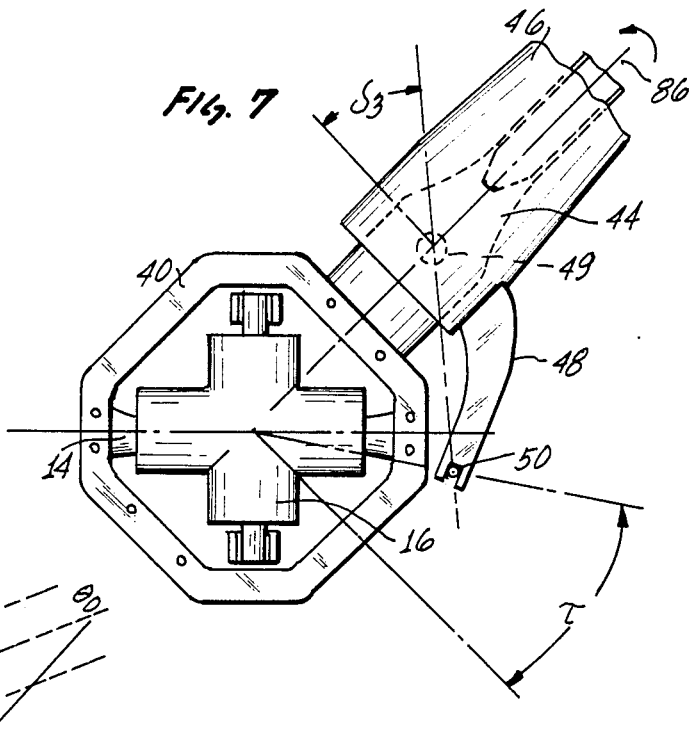
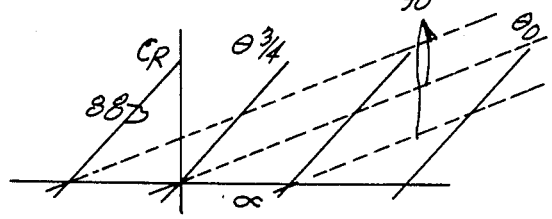
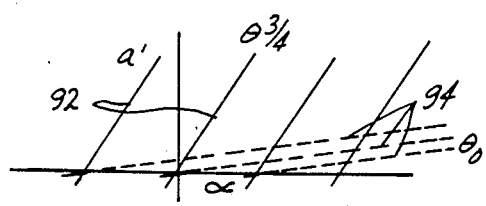

ALL COMPOSITE, CONSTANT SPEED UNIVERSAL JOINT FOR USE IN A SHAFT DRIVEN TILTABLE MAIN ROTOR FOR A HELICOPTER

BACKGROUND OF THE INVENTION

1. Field of the Invention

The present invention relates to the field of rotary winged aircraft and in particular to main rotor systems in a helicopter with a tiltable rotor.

2. Description of the Prior Art

Helicopters with pitch cone rotors have long been the subject of intensive development and have exhibited many desirable flight characteristics. For example, helicopters with pitch cone coupling have been found to respond smoothly to the application of collective control thereby giving a cushioned response as opposed to an abrupt vertical movement to the aircraft which is typical of collective pitch controls in other types of rotor systems. Positive lateral and longitudinal stability with pitch cone coupled rotors are also outstanding when compared with current operational helicopters. The ability to turn up and shut down in high winds and the absence of ground resonance tendencies are further among the advantages of a pitch cone rotor. Hover stability and dynamic longitudinal stability are outstanding as well. However, the design of direct shaft-driven pitch cone rotor systems has not been successful. Most pitch cone rotor systems under active development have used tip jet powered rotors because of an unacceptible two per revolution torque oscillation which is characteristic when a shaft-driven rotor hub is tilted. Examples of development of such prior art pitch cone rotor systems are described in detail in the Navy Evaluation of the model 120 helicopter, Project TED No. PTRAC/42101.1, Naval Air Test Center, Patuxent River, Md., and in the Phase Two Flight Evaluation, Air Force Flight Test Center, TR-56-35, Edwards Air Force Base, Calif.

Therefore, what is needed is some means by which a rotor hub can be directly shaft-driven in a pitch cone rotor design.

BRIEF SUMMARY OF THE INVENTION

The present invention is an improvement in a pitch cone rotor system in a helicopter comprising a plurality of rotor blades, a driven shaft and means for resiliently coupling the driven shaft to the plurality of pitch cone rotor blades. By reason of this combination of elements the plurality of pitch cone rotor blades are mechanically driven by applied torque from a shaft.

The mechanism for resiliently coupling the driven shaft and pitch cone rotor blades comprises a first crossbeam rigidly coupled to the driven shaft, a cruciform case resiliently coupled to the first crossbeam, a second crossbeam resiliently coupled to the cruciform case, the second crossbeam being coupled to the plurality of pitch cone rotor blades.

The improvement further comprises a plurality of S-beam members for resiliently coupling the first and second crossbeams to the cruciform case.

The improvement further comprises a flexible elastomeric tension link coupling the first and second crossbeam members, the first and second crossbeam members being characterized by an overlapping and crossing relationship. Each crossbeam is disposed within the cruciform case, and the flexible elastomeric tension link is disposed through the cruciform case and crossbeam members thereby coupling each to the other. The link is disposed through the first and second crossbeam members at the center of their crossing.

The improvement further comprises a hollow laminated elastomeric compression fitting disposed between the first and second crossbeam members at said center of their crossing. The flexible elastomeric tension link is disposed through said hollow elaminated elastomeric compression fitting. The compression fitting transmits rotor lift forces between the first and second crossbeams.

Alternately stated the invention comprises a universal joint for use in a pitch cone rotor system comprising a mechanism for coupling to a rotor hub, a mechanism for coupling to a driven shaft, and a mechanism for transmitting force and torque between the mechanism for coupling to said rotor hub and the mechanism for coupling to the driven shaft. The mechanism for transmitting force and torque allows the rotor hub to tilt in all directions. By reason of this combination of elements the advantages of a pitch cone rotor system can be realized in a directly shaft-driven rotor system.

Stated in yet another way the invention includes an improvement in a pitch cone rotor system including a rotor hub and a driven shaft, wherein the improvement comprises a universal joint coupling said rotor hub to the rotor shaft. The universal joint comprises a first and second crossed lift beam. The first lift beam is coupled to the hub and the second lift beam is coupled to the driven shaft. The universal joint further comprises a mechanism for torsionally rigidly transferring all torques between the first and second crossed lift beams, and a mechanism for permitting angular and translational deflections of the crossed lift beams with respect to each other. By reasons of this combination of elements the universal joint reduces sudden changes in the rotor speed.

Turn now to the following Figures wherein like elements are referenced by like numerals.

DESCRIPTION OF THE DRAWINGS

FIG. 5 is a simplified cross-sectional view of a first embodiment showing the direct shaft coupling between the torque input shaft and rotor shaft support of FIG. 4.

FIG. 6 is a simplified cross-sectional view of a second embodiment showing the coupling between the torque input shaft and rotor support shaft of FIG. 4.

FIG. 7 is a diagrammatic partial plan view of the rotor hub of FIG. 3.

FIG. 8 is a graph of the lift coefficient versus the pitch angle angle of the rotor plane.

FIG. 9 is a graph of the tip plane angle versus the pitch angle of the rotor plane.

The invention and its various embodiments are better understood by now turning to the following detailed description.

DETAILED DESCRIPTION OF THE PREFERRED EMBODIMENTS

The universal joint of the invention is a resilient universal joint made from composite materials and is comprised of crossed, composite S-beams incorporated into the hub of the heicopter's main rotor. All force and torque loads in the rotor and on the helicopter airframe are transmitted through the universal joint while permitting the hub to tilt arbitrarily. Therefore, the universal joint is of particular utility in a pitch cone rotor system and the advantages of such a pitch cone rotor system, are thereby achieved while the rotor system is directly shaft-driven through the universal joint.

Figure 1:
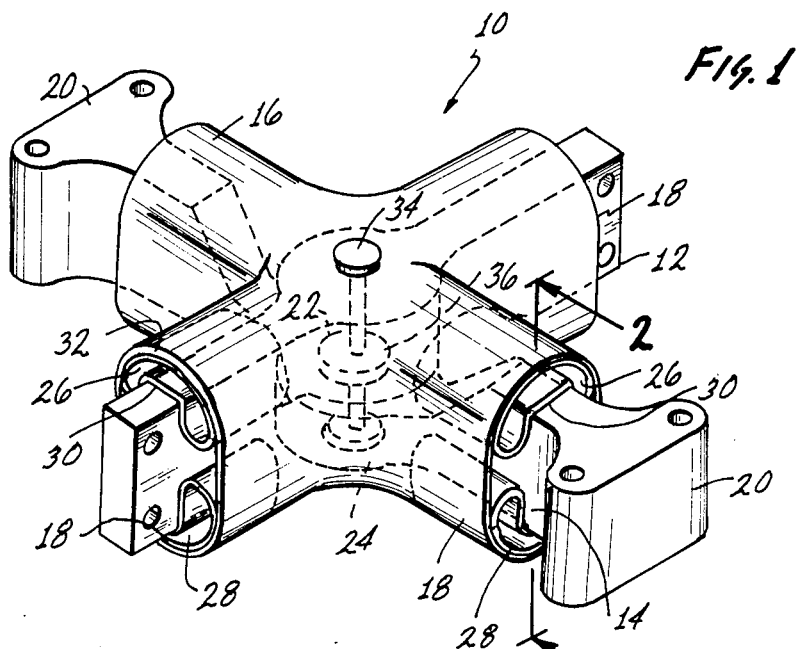
FIG. 1 is a perspective view in simplified form of a universal joint for use in a rotor hub incorporating the invention.

Consider the invention now as pictorially depicted in simplified perspective view in FIG. 1. The universal joint, generally denoted by reference numeral 10, in the illustrated embodiment is comprised of a first crossbeam 12 and a second generally perpendicularly disposed crossbeam 14. Crossbeams 12 and 14 are disposed within a cruciform case 16. Cruciform case 16 is an integral X-shaped hollow body characterized by two generally perpendicular hollow passages 18 through which crossbeams 12 and 14 extend. Thus, cruciform case 16, which may be made from a composite fiber materials through processes well known to the art, resembles a contoured, X-shaped pipe fitting. The cross-sectional configuration of each arm, as better depicted in FIGS. 2a–2d, is generally elipical although other cross-sectional configurations are expressly contemplated as being within the scope of the invention. For example, the arms of cruciform case 16 may include rectangular cross sections and circular cross sections as well.

Figure 3:
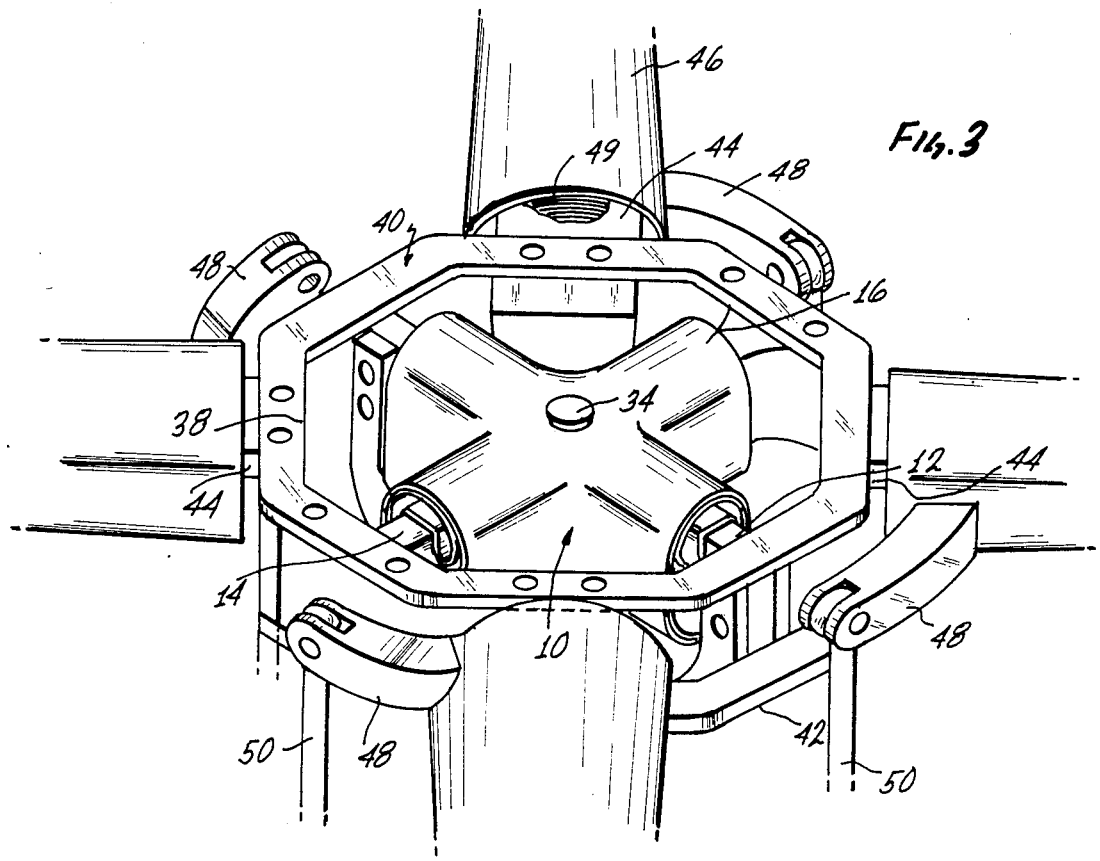
FIG. 3 is a partial perspective view of the universal joint installed in a main rotor hub.

Crossbeams 12 and 14 each include two terminal ends 18 and 20 respectively which, as will be described in connection with FIG. 3, are coupled to the rotor hub. Crossbeams 12 and 14 are contoured between ends 18 and 20 respectively to include a center arcuate section 22 and 24 respectively which section is latterally offset from the axis of crossbeams 12 and 14 and which permit the crossbeams to be perpendicularly overlapped without direct contact.

Each crossbeam 12 and 14 is coupled to cruciform case 16 through the pair of resilient, prismatic S-beam members 26 and 28. Each arm of cruciform case 16 is provided with a pair of S-beam members 26 and 28 so that each crossbeam 12 and 14 is supported and coupled at its opposing ends to cruciform case 16. In the preferred embodiment S-beam members 26 and 28 are comprised of composite fiber materials but other resilient materials, including conventional metallic alloys could be substituted as well. S-beam members 26 and 28 are bonded to the crossbeams 12 and 14 along surface 95 and are each arranged and configured to contact a predetermined length of each end of crossbeams 12 and 14 along mutual surface 30 of the crossbeam and S-beam member, as more easily seen in cross-sectional view in FIGS. 2a–2d. Similarly each S-beam member 26 and 28 is bonded to the generally opposing interior surface of the corresponding arm of cruciform case 16 through a predetermined width 32 of mutual contact between S-beam 26 and 28 and composite case 16. Again, the area of bonding of mutual contact 32 between S-beam 26 and 28 and cruciform case 16 is best illustrated in cross-sectional view in FIGS. 2a–2d. The remaining portions of S-beam members 26 and 28 remain free and are unbonded to either crossbeams 12 and 14 or to the interior surface of cruciform case 16 thereby permitting a predetermined degree of flexure of each S-beam member 26 and 28 as better described below.

Crossbeams 12 and 14 are coupled together by means of a flexible elastomeric tension link 34 longitudinally disposed through the center of cruciform case 16 and crossbeams 12 and 14. Link 34 conducts rotor loads between crossbeams 12 and 14 when the rotor, to which universal joint 10 is connected, developes negative lift loads on the ground or in flight. Link 34 is similarly disposed through the center of a hollow laminated elastomeric compression fitting 36 disposed between crossbeams 12 and 14 at the center of their crossing. Compression fitting 36 transmits the rotor lift force between crossbeams 12 and 14.

Figure 2A:
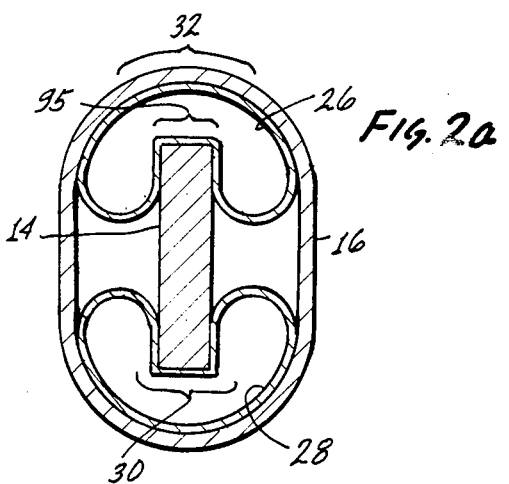
FIG. 2a is a cross-sectional view taken through line 2—2 of FIG. 1.

Before considering the installation of universal joint 10 within a rotor hub as depicted in FIG. 3 turn first to the diagrammatic depictions of FIGS. 2a–2d which illustrate the flexure of crossbeams 12 and 14 within cruciform case 16 as borne by S-beam members 26 and 28. FIG. 2a is a cross-sectional view taken through line 2—2 of FIG. 1. A cross-sectional view taken through a corresponding arm of cruciform case 16 associated with crossbeam 12 would be identical. FIG. 2a represents the normal nondeflected position of crossbeam 14 within cruciform case 16.

Figure 2B:
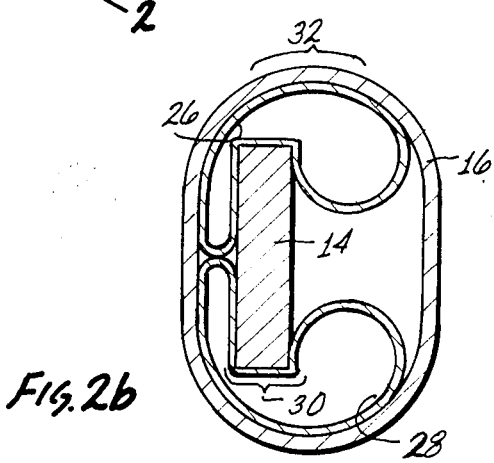
FIG. 2b is the cross-sectional view of FIG. 2a depicting the universal joint after a lateral translation has occurred.

Turning first to FIG. 2b which is the cross-sectional view of FIG. 2a depicting a lateral translation of crossbeam 14 within cruciform case 16. As shown in FIG. 2b S-beam flexures 26 and 28 compress and extend toward each other on the left side of crossbeam 14. Meanwhile, S-beam members 26 and 28 are flattened and extended on the right side of crossbeam 14 thereby permitting lateral translation of crossbeam 14 within the plane of cruciform case 16.

Figure 2C:
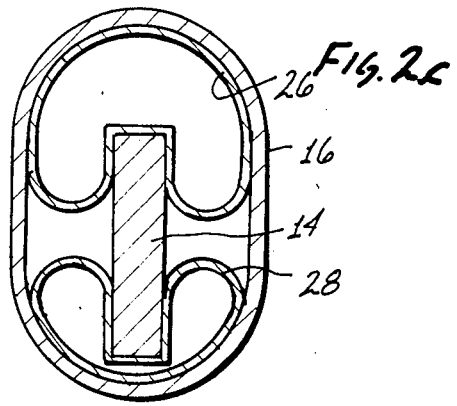
FIG. 2c is a cross-sectional view of FIG. 2a depicting a vertical translation of the universal joint.

Turning now to FIG. 2c a panel which is the cross-sectional view of FIG. 2a depicting a vertical translation of crossbeam 14 within cruciform case 16. In the illustrated depiction of FIG. 2c, crossbeam 14 is linearly translated downward within cruciform case 16 in a direction parallel to the longitudinal axis of cruciform case 16 or the axis of rotation. S-beam member 28 folds in at its center by compressing both the left and right sides of S-beam member 28 while opposing S-beam member 26 extends outwardly on its left and right sides to permit the downward vertical translation of crossbeam 14.

Figure 2D:
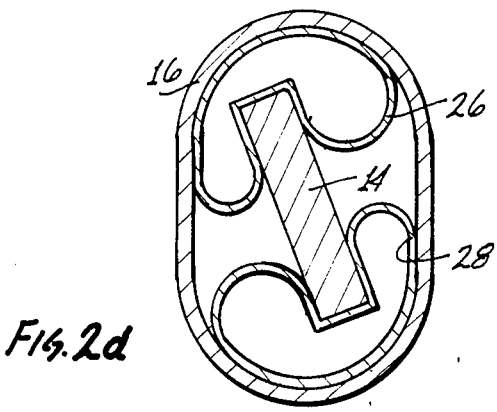
FIG. 2d is the cross-sectional view of FIG. 2a depicting a rotation of the universal joint.

Finally, turn now to FIG. 2d which is the cross-sectional view of FIG. 2a depicting a rotation of crossbeam 14 within cruciform case 16. Crossbeam 14 here has been rotated about an axis perpendicular to the longitudinal axis of cruciform case 16 lying in the plane of mere symmetry of cruciform case 16. The left and right sides of S-beam members 26 and 28 compress and extend as appropriate and roll within cruciform case 16 to permit the rotation of crossbeam 14.

FIGS. 2a–2d represent the movement of crossbeam 12 and 14 in three degrees of freedom, namely two directions of linear translation and one direction of rotation. However, crossbeams 12 and 14 are generally free to rotate and translate in an arbitrary manner within cruciform case 16 and, in the typical case, will be displaced and oriented within cruciform case 16 through a combination of displacements in each degree of freedom possible. This includes, but it is not limited to, rotation about the longitudinal axis of the rotor hub or the axis of rotation of the rotor itself. In the illustrated embodiment the only degree of freedom of motion which is restricted to any degree are linear displacements in the direction of the axis of crossbeams 12 and 14 themselves, such displacements being prohibited or limited by the restraint of prismatically shaped S-beam members 26 and 28 at each end.

The installation of universal joint 10 in a pitch cone rotor hub is better illustrated in pictorial perspective in FIG. 3 wherein universal joint 10 is shown as coupled to a rotor support shaft 38 partailly shown in FIG. 3 and depicted in isolation in pictorial perspective in FIG. 4 as described below. Support shaft 38 is rigidly coupled by bonding, bolting or other conventional means to the ends of crossbeam 12. The orthagonal crossbeam 14 is similarly rigidly coupled to the blade support rings 40 and 42. Upper support ring 40 is completely depicted in FIG. 3 while lower support ring 42 is partially shown. Support rings 40 and 42 are generally parallel to each other and spaced apart by means of their coupling to ends 20 of crossbeam 14. Although not depicted in detail, each of the blades of the rotor system are similarly coupled to blade support rings 40 and 42 according to conventional means. Only blade roots 44 are visible in the illustrated of FIG. 3. Blade roots 44 are each disposed within an enclosing conventional blade pitch case 46 which is centered and spaced apart from blade root 44 by an elastomeric snubber 49, one of which is visible in FIG. 3. A pair of such snubbers 48 are placed on opposing points of blade root 44 between it and the opposing interior surface of the corresponding pitch case 46. Each pitch case further includes a pitch horn 48 which is coupled to a pitch link 50 used to apply a rotating torque to blade root 44 through pitch horn 48 and pitch case 46. Pitch links 50 are in turn coupled to a conventional rotating swashplate (not shown) for the control of both collective and cyclic pitch. The various elements of the rotor system are described here only for the purpose of showing the environment and do not serve to limit or restrict the scope of the invention. The remaining elements of the rotor system are conventional and therefore no further detailed discussion of them is necessary.

Figure 4:
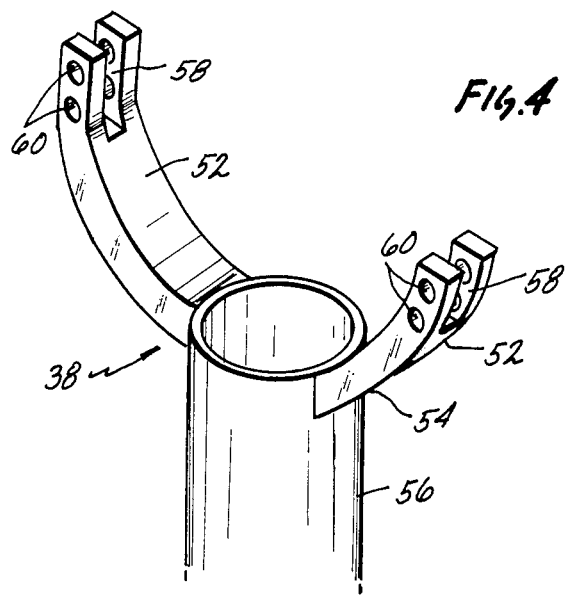
FIG. 4 is a simplified perspective view of the rotor support shaft partially depicted in FIG. 3 as used in the universal joint.

Turn now to FIG. 4 wherein rotor support shaft 38 as partailly shown in the perspective of FIG. 3 is fully shown in the pictorial perspective of FIG. 4. Rotor support shaft 38 is comprised of two arms 52 having one end 54 rigidly coupled to a driven shaft 56 and an opposing end which is slotted to receive ends 18 of crossbeam 12 as depicted in FIG. 1. Therefore ends 18 snuggly slip within slots 58 and are fixed thereto by the disposition of bolts through hole 60 or by other conventional means. Therefore, the rotational power delivered through shaft 56 is transmitted via arms 52 to crossbeam 12, through S-beam members 26 and 28 coupled between crossbeam 12 and cruciform case 16 to S-beam members 26 and 28 coupled to crossbeam 14. The rotational motion is thence imparted from crossbeam 14 to blade support rings 40 and 42, to blade roots 44 and ultimately to the blades of the rotor system. However, the coupling of support shaft 38 may assume other alternative forms such as depicted in FIGS. 5 and 6.

Turn first to FIG. 5 wherein support shaft 38 is shown as bolted to a rotating shaft 62. In the embodiment of FIG. 5 support shaft 38 is provided at its lower end with a flange 64 and a through-hole 66, through which a bolt 68 extends. A corresponding through-hole is defined in a mating upper flange 70 of rotating shaft 62. Flanges 70 and 64 are bolted together in a plurality of locations. Shaft 62 is a hollow cylindrical shaft supported by the external rigid stationary mast 72 and journaled thereto by means of bearings 74.

Turn now to the second embodiment of FIG. 6. In FIG. 6 rotor support shaft 38 is extended cylindrically downward to be telescopically disposed within a stationary mast 76. Lower cylindrical portion 78 of support shaft 38 is retained upon stationary mast 76 by means of conventional bearing assemblies 80. Support shaft 38 is powered by means of a separate hollow cylindrical torque shaft 82 which is telescopically disposed outside of stationary mast 76 and of cylindrical portion 78 of rotor support shaft 38. Torque shaft 82 and support shaft 38 are coupled together by means of a plurality of conventional splines 84 or other equivalent means.

Turn now to the plan view of a pitch cone rotor system incorporating the invention as depicted in FIG. 7. For simplicity a single blade is shown although in the illustrated embodiment a four blade rotor system is contemplated. The geometry of the pitch cone rotor system is clearly depicted in the plan view of FIG. 7. The pitch cone coupling ratio, $\delta_3$, is defined as the angle betwen the axis through pitch link 50 and the offset flapping hinge defined by snubber 49 and the perpendicular to the blade feathering axis 86. The configuration as depicted in FIG. 7 causes the blade pitch angle to reduce as the blade cone moves upwardly when the blades move in unison. The pitch angle is little influenced by cyclic flapping of the blades. The control advance angle, $\tau$, measured between a perpendicular to feathering axis 86 and pitch link 50 as depicted in the plan view of FIG. 7, is a measure of the longitudinal/lateral cyclic control coupling. Ideally, advance control angle $\tau$ is as close to zero as the mechanical design of this rotor system will allow.

The operation of the pitch cone rotor system as depicted in FIG. 7 can quantitatively be understood by now referring to the graphs of FIGS. 8 and 9.

Turning first to FIG. 8, a graph of the lift coefficient, $C_{195}$, is plotted against alpha, the angle of attack of the rotor plane for a constant collective pitch at ¼ radius, theta ¾, with a cross plot for a constant collective pitch angle, theta $\theta$. The solid family of curves 88, represent the relationship between lift coefficient and angle of attack of rotor plane for a conventionally articulated rotor system. Dotted curves 90, plotted for a constant collective pitch angle, represents the lift coefficient as a function of the angle of attack of the rotor plane for a pitch cone rotor system. The lower slope of the lift coefficient curve in the case of pitch cone rotor systems represents a lower ensitivity of the lift coefficient and hance sensitivity of the lift of the rotor system to sudden changes in the effective angle of attack of the rotor plane. Therefore, a pitch cone rotor system is substantially less sensitive to gusts or sudden changes in wind direction than conventional articulated rotor systems. The present invention allows such performance to be obtained in a pitch cone rotor system which is directly shaft-driven such as shown in one of the embodiments of FIGS. 4–6 or any means now known or later devised equivalent thereto.

FIG. 9 is a graph of the tip plane angle, a', graphed against the angle of attack of the rotor plane, α. Again, solid curves 92 represent the tip plane angle versus angle of attack of the rotor plane for constant collective pitch at ¾ radius. Cross plotted against solid curves 92 is a family of dotted curves 94 which represents the functional relationship between tip plane angle, a', and angle of attack of rotor plane, α, for constant collective pitch angles, theta$\theta$. Again the graph dramatically illustrates that the derivative of tip plane angle with respect to the angle of attack of the rotor plane, or the slope of curves 92 compared to curves 94 is substantially different. The smaller rate of change of tip plane angle with respect to changes in angle of attack of the rotor plane indicates that the pitch cone rotor system represented by curves 94 is much more stable than a conventional articulated rotor system represented by curves 92. In fact, if the pitch cone ratio can be made high enough, the derivative of the tip plane angle with respect to the angle of attack of the rotor plane will become negative rather than positive as shown in FIG. 9 with the result that the pitch cone rotor system will exhibit a positive stability with respect to changes in angle of attack. Again this advantage of pitch cone rotor systems can be practically realized for the first time due to the ability to directly drive the pitch cone rotor system through direct mechanical torque applied throug a shaft.

Many modifications and alterations may be made by those having ordinary skill in the art without departing from the spirit and scope of the invention. The illustrated embodiment has been set forth only for the purposes of example and should not be taken as limiting the invention which is defined in the following claims.

We claim:

1. An improvement in a pitch cone rotor system in a helicopter comprising:
   a plurality of rotor blades;
   a driven shaft;
   a rotor hub coupled to said plurality of rotor blades;
   universal joint means for resiliently coupling said driven shaft to said rotor hub with three degrees of rotational and three degrees of translational freedom,
   whereby said plurality of pitch cone rotor blades are mechanically driven by applied torque,
   wherein said means for resiliently coupling said driven shaft and pitch cone rotor blades comprises a first crossbeam rigidly coupled to said driven shaft;
   a cruciform case resiliently coupled to said first crossbeam;
   a second crossbeam resiliently coupled to said cruciform case, said second crossbeam being coupled to said plurality of pitch cone rotor blades.

2. The improvement of claim 1 further comprising a plurality of S-beam members for resiliently coupling said first and second crossbeams to said cruciform case, said S-beam members being coupled between said first and second crossbeams.

3. The improvement of claim 2 wherein said S-beam member is a prismatic, resilient composite sleeve characterized by having one surface with an outward convex curvature and an opposing surface with an inward concave curvature, said crossbeams coupled to said opposing surface having an inward concave curvature.

4. The improvement of claim 3 wherein a pair of said S-beam members are disposed between each end of said first and second crossbeam and said cruciform case, each crossbeam being disposed within said cruciform case.

5. A universal joint for use in a pitch cone rotor system, said system including a rotor hub and a driven shaft comprising:
   first means for coupling to said rotor hub;
   second means for coupling to said driven shaft; and
   third means coupled to said first and second means for transmitting force and torque between said first means for coupling to said rotor hub and said second means for coupling to said driven shaft, said third means for transmitting force and torque allowing said rotor hub to tilt in all directions,
   whereby advantages of a pitch cone rotor system can be realized in a directly shaft-driven rotor system,
   wherein said first means for coupling to said rotor hub comprises a first crossbeam rigidly connected to said rotor hub, and wherein said second means for coupling to said driven shaft comprises a rigidly connected orthogonal crossbeam to said driven.

6. The universal joint of claim 5 wherein said third means for transmitting force between said first means for coupling to said rotor hub and second means for coupling to said driven shaft comprises a cruciform case made of composite fiber materials and a plurality of flexures made of composite materials, said flexures resiliently coupling said cruciform case to said first and second crossbeams.

7. The universal joint of claim 6 wherein each of said flexures comprises a prismatically shaped sleeve characterized by a first surface segment affixed to said cruciform case and a second surface segment affixed to a corresponding one of said first and second crossbeams, said flexure further characterized by a free unattached arcuate surface segment coupling said first and second affixed surface segments of said flexure whereby said corresponding crossbeam is resiliently coupled to said cruciform case.

8. The universal joint of claim 7 wherein each said flexure comprises at least two free unattached surface segments coupling said first and second affixed segments.

9. The universal joint of claim 7 wherein said first surface segment of each flexure is a concave surface segment bonded to an internal surface of said cruciform case and said second surface segment is a concave opposing surface bonded to said corresponding crossbeam.

* * * * *